United States Patent
Sugihara

(10) Patent No.: US 10,528,467 B2
(45) Date of Patent: Jan. 7, 2020

(54) INFORMATION PROCESSING DEVICE AND INFORMATION PROCESSING METHOD

(71) Applicant: FUJITSU TEN LIMITED, Kobe-shi, Hyogo (JP)

(72) Inventor: Masaru Sugihara, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/627,931

(22) Filed: Jun. 20, 2017

(65) Prior Publication Data

US 2018/0018260 A1 Jan. 18, 2018

(30) Foreign Application Priority Data

Jul. 13, 2016 (JP) .................... 2016-138615

(51) Int. Cl.
*G06F 12/06* (2006.01)
*G06F 12/14* (2006.01)
*G06F 12/0893* (2016.01)
*G06F 12/0804* (2016.01)

(52) U.S. Cl.
CPC ...... *G06F 12/0653* (2013.01); *G06F 12/0893* (2013.01); *G06F 12/1475* (2013.01); *G06F 12/0804* (2013.01); *G06F 2212/1052* (2013.01)

(58) Field of Classification Search
CPC .................................................. G06F 12/1458
See application file for complete search history.

(56) References Cited

U.S. PATENT DOCUMENTS

| | | | | |
|---|---|---|---|---|
| 8,051,409 | B1* | 11/2011 | Umamageswaran | ........................ G06F 11/3471 717/127 |
| 2014/0156961 | A1* | 6/2014 | Hadley | ................... G06F 21/54 711/163 |
| 2014/0325274 | A1* | 10/2014 | Mueller | .............. G06F 11/1441 714/23 |
| 2017/0164199 | A1* | 6/2017 | Kong | ................... H04B 1/3822 |
| 2017/0177861 | A1* | 6/2017 | Sunada | ................... G06F 21/55 |

FOREIGN PATENT DOCUMENTS

JP 2013-109393 A 6/2013

* cited by examiner

*Primary Examiner* — Edward J Dudek, Jr.
(74) *Attorney, Agent, or Firm* — Oliff PLC

(57) ABSTRACT

An information processing device according to an embodiment includes a memory and a mediation unit. The memory includes memory use areas that are allocated to respective tasks, and an identification-information area that identifies the tasks. The mediation unit mediates writing and reading, by one of the tasks, into and from one of the memory use areas. When accepting a request of the writing and reading from the one task, the mediation unit writes one of the identification informations corresponding to the one task into the identification-information area, further reads information memorized in the identification-information area at a predetermined timing, and detects an abnormality in the memory on the basis of the read information.

7 Claims, 5 Drawing Sheets

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2016-138615, filed on Jul. 13, 2016, the entire contents of which are incorporated herein by reference.

FIELD

The embodiment discussed herein is directed to an information processing device and an information processing method.

BACKGROUND

Conventionally, there is known an information processing device, such as a microcomputer, which performs, when a task to be executed accesses a memory, memory protection by using dedicated hardware such as a so-called Memory Management Unit (MMU) (for example, see Japanese Laid-open Patent Publication No. 2013-109393).

When a task is doing to access a memory use area not allocated to this task in a state where tasks are allocated to respective memory use areas, the MMU detects this access as a memory protection offense.

SUMMARY

An information processing device according to an embodiment includes a memory and a mediation unit. The memory includes memory use areas that are allocated to respective tasks, and an identification-information area that identifies the tasks. The mediation unit mediates writing and reading, by one of the tasks, into and from one of the memory use areas. When accepting a request of the writing and reading from the one task, the mediation unit writes one of the identification informations corresponding to the one task into the identification-information area, further reads information memorized in the identification-information area at a predetermined timing, and detects an abnormality in the memory on the basis of the read

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment of an information processing device and an information processing method will be described in detail with reference to the accompanying drawings. Moreover, the disclosed technology is not limited to the embodiment described below.

Figure 1:
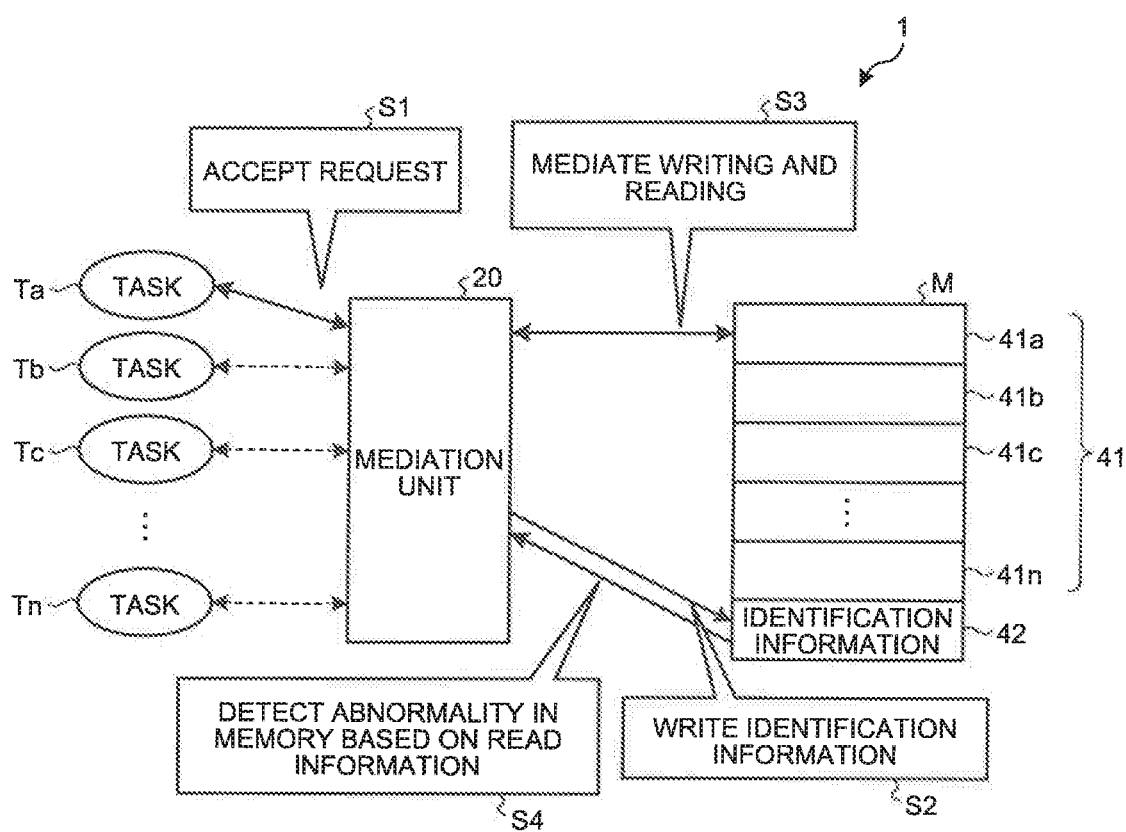
FIG. 1 is a diagram illustrating an outline of an information processing method according to a present embodiment.

First, an outline of the information processing method according to the present embodiment will be explained with reference to FIG. 1. FIG. 1 is a diagram illustrating the outline of the information processing method according to the present embodiment. In FIG. 1, the case where each task accesses a memory M will be explained. Memory use areas $41a$ to $41n$ illustrated in FIG. 1 are assumed to be areas allocated to respective tasks Ta to Tn.

When the abnormality occurs in operations of the tasks T, the memory abnormality occurs in some cases, in which the task Ta accesses an area other than the memory use area $41a$ allocated to the task Ta, or another task T accesses the memory use area $41a$. Conventionally, the dedicated hardware such as a Memory Management Unit (MMU) detects this memory abnormality so as to perform the memory protection. However, there exists a problem that the cost of the information processing device increases when using the dedicated hardware.

Therefore, a information processing device 1 according to the present embodiment is to perform the memory protection without using the aforementioned dedicated hardware.

Specifically, the information processing device 1 is to be provided with a mediation unit 20 that mediates writing and reading, by the task T, into and from a memory use area 41. The memory M of the information processing device 1 is to be provided with an identification-information area 42 that memorizes identification information I in addition to the memory use areas 41 respectively allocated to the tasks T.

Herein, the mediation unit 20 executes a process similar to that of the task T. In other words, the information processing method according to the present embodiment realizes the memory protection by using, not the dedicated hardware, but the software.

As illustrated in FIG. 1, for example, when accepting a request from the task Ta (Step S1), the mediation unit 20 writes identification information Ia of the task Ta into the identification-information area 42 (Step S2). The mediation unit 20 mediates the writing and reading requested by the task Ta (Step S3).

On the other hand, the mediation unit 20 reads, at a predetermined timing, information memorized in the identification-information area 42, and detects the protection abnormality in the memory M on the basis of the read information (Step S4). For example, when the information read in Step S4 is different from the identification information Ta that would be written into in Step S2, the mediation unit 20 detects the protection abnormality in the memory M.

Specifically, if the task T (for example, task Tb, etc.) other than the task Ta executes an incorrect writing on the memory M caused by the runaway and the like, the identification-information area 42 is overwritten in some cases. The mediation unit 20 reads, at a predetermined timing, the information memorized in the identification-information area 42 to detect this incorrect memory access.

When detecting such a protection abnormality in the memory M, for example, the mediation unit 20 restarts the information processing device 1 to prevent the information processing device 1 from continuing to operate in a state where the memory M has abnormality. In other words, the information processing device 1 operates only in a state where the memory M is normal, and thus the information processing method according to the present embodiment can ensure the memory protection during the operation of the information processing device 1.

By employing the information processing method according to the present embodiment, the memory protection can be performed as a function of the software, and thus any additional dedicated hardware is not needed. Therefore, by employing the information processing method according to the present embodiment, the memory protection can be performed inexpensively.

Figure 2:
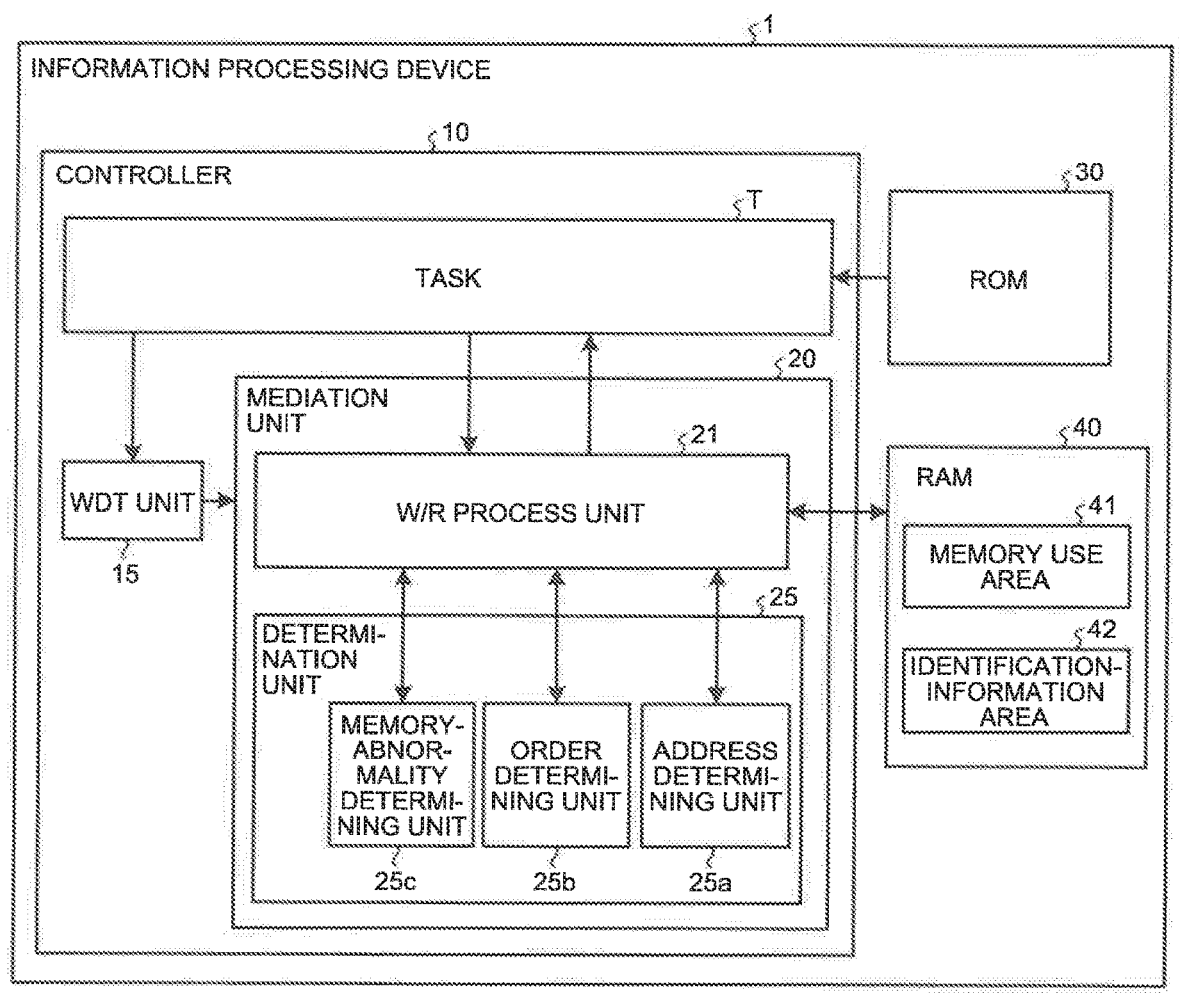
FIG. 2 is a block diagram illustrating a configuration of an information processing device according to the present embodiment.

Hereinafter, the information processing device 1 according to the present embodiment will be explained more specifically. First, a configuration example of the information processing device 1 will be explained with reference to FIG. 2. FIG. 2 is a block diagram illustrating a configuration of the information processing device 1 according to the present embodiment.

Hereinafter the case where the memory M includes a Random Access Memory (RAM) 40 will be explained. However, if the memory can rewrite the memorized information, any kind of memory may be employed.

As illustrated in FIG. 2, the information processing device 1 includes a controller 10, a Read Only Memory (ROM) 30, and the RAM 40.

The ROM 30 is a non-volatile memory, and memorizes various programs for operating, caused by the controller 10, of the tasks T, a WatchDog Timer unit 15 (hereinafter, may be referred to as "WDT unit 15"), add the mediation unit 20; initial values used by the tasks T in computing, etc.; and the like.

Figure 3:
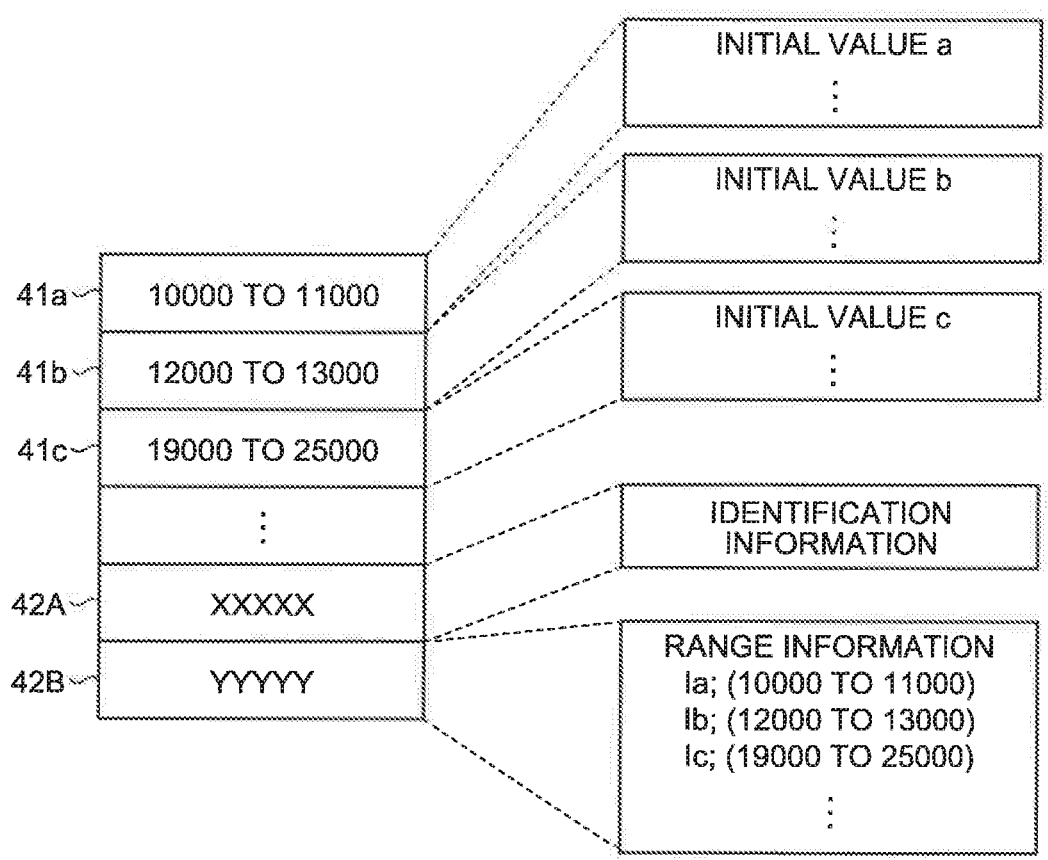
FIG. 3 is a diagram illustrating a configuration example of a memory.

The RAM 40 is a non-volatile memory, and can perform writing and reading of the information. Herein, a configuration of the RAM 40 will be explained with reference to FIG. 3. FIG. 3 is a diagram illustrating a configuration example of the memory M (RAM 40).

As illustrated in FIG. 3, the RAM 40 includes the identification-information area 42 and the memory use areas 41 that are divided for each of the tasks T. In the memory use areas 41, a plurality of divided areas are allocated to the respective tasks T, and each of the areas memorizes information needed for the process of the corresponding task T.

The identification-information area 42 includes a area 42A that memorizes the identification information I and a area 42B that memorizes information (hereinafter, may be referred to as "range information") on an address ranges of the respective memory use areas 41 allocated to the tasks T.

The RAM 40 is a non-volatile memory, and thus information memorized in the RAM 40 is lost when a power source of the information processing device 1 is turned off. Initial data is written into the RAM 40 when the power source of the information processing device 1 is turned on. The initial data includes information on an initial value, etc. needed for the operation, etc. of each of the tasks T; the aforementioned range information; and the like.

Specifically, the controller 10 (see FIG. 2) reads the initial data from the ROM 30, and writes the read initial data into the RAM 40. When the writing of the initial data is normally completed, the controller 10 writes, into the area 42A, initialization identifying information indicating that the initialization is normally completed.

In other words, when the initialization of the RAM 40 is normally completed, the initialization identifying information is memorized in the identification-information area 42.

The mediation unit 20 reads the information memorized in the area 42A after the initialization, and, when the initialization identifying information is not memorized therein, can detect the initialization abnormality in the RAM 40.

Returning to FIG. 2, the controller 10 will be explained. The controller 10 includes, for example, a Central Processing Unit (CPU), and controls whole of the information processing device 1. The controller 10 includes the tasks T, the WDT unit 15, and the mediation unit 20. The controller 10 reads and executes programs preliminary memorized in the ROM 30 to realize functions of the tasks T, the WDT unit 15, and the mediation unit 20. The controller 10 sequentially executes the tasks T, and the operation of the mediation unit 20, the operation of the WDT unit 15, and each of the tasks T are executed in parallel with one another.

The task T executes writing and reading into and from the memory use area 41 of the RAM 40 by using the mediation unit 20 to execute a process such as a computing. Specifically, the task T outputs, to a W/R process unit 21 of the mediation unit 20, the identification information and a request (hereinafter, may be referred to as "processing request") of writing and reading. The task T outputs a timer request to the WDT unit 15.

The processing request is a request that instructs the mediation unit 20 to write and read into and from a specified memory address (hereinafter, may be referred to as "specified memory address") in the memory use areas 41. The specified memory address is the memory use area 41 that is allocated to the task T.

When the last task T is defined, this processing request includes task specifying information that specifies the last task T. The task specifying information includes, for example, the identification information I of the task T to be specified.

When receiving the timer request from the task T, the WDT unit 15 sets a threshold time specified by this request, and starts to count. When a completion notification is input from the mediation unit 20, which indicates that the writing and reading based on the processing request is completed, the WDT unit 15 stops the counting, and resets the count value.

When the aforementioned completion notification is not input to the WDT unit 15 until the count value reaches the threshold time, the WDT unit 15 outputs an excess notification to the mediation unit 20. When the excess notification is input to the mediation unit 20, for example, the mediation unit 20 restarts the information processing device 1 as a coping process with the abnormality.

In ether words, when a failure such as runaway of the task T occurs, information processing device immediately restarted, and thus the information processing device 1 can be quickly restored to a normal state.

The mediation unit 20 mediates writing and reading into and from the memory use area 41 by the task T. When accepting a processing request from the task T, the mediation unit 20 writes, into the identification-information area 42, the identification information I corresponding to this task T.

The mediation unit 20 reads the information memorized in the identification-information area 42 at a predetermined timing, and detects the abnormality in the RAM 40 on the basis of the read information. The mediation unit 20 includes the W/R process unit 21 and a determination unit 25.

The W/R process unit 21 executes writing and reading into and from the memory use area 41 on the basis of the processing request input from the task T. The W/R process unit 21 reads, at a predetermined timing, the information memorized in the identification-information area 42, and outputs the read information to the determination unit 25.

Specifically, first, when the processing request and the identification information I are input from the task T, the W/R process unit 21 reads the information memorized in the identification-information area 42.

When the information processing device 1 normally operates, the information read from the identification-information area 42 includes the identification information of the last task T and the aforementioned range information.

Subsequently, the W/R process unit 21 outputs, to an address determining unit 25*a*, the range information and the specified memory address included in the processing request. The W/R process unit 21 outputs, to an order determining unit 25*b*, the identification information input from the task T and the identification information I of the last task T.

Thus, the address determining unit 25*a* and the order determining unit 25*b* executes respective determination processes to be mentioned later. When results of these determination processes are normal, the address determining unit 25*a* and the order determining unit 25*b* output respective permission notifications to the W/R process unit 21.

When the permission notifications are input from both the address determining unit 25*a* and the order determining unit 25*b*, the W/R process unit 21 starts to write and read into and from the memory use area 41 of the RAM 40 on the basis of the processing request.

The W/R process unit 21 writes the identification information I of the task T into the identification-information area 42 before, for example, the start to write and read into and from the memory use area 41. In other words, the W/R process unit 21 updates the identification information I memorized in the identification-information area 42.

Hereinafter, the last identification information I memorized in the identification-information area 42 just before the update may be referred to as "the last identification information I", and the identification information I just after the update may be referred to as "present identification information I". The task T corresponding to the last identification information I may be referred to as "the last task T", and the task T corresponding to the present identification information I may be referred to as "present task T".

The W/R process unit 21 reads the information memorized in the area 42A at a predetermined timing in an interval from the time when the identification information I is written into the area 42A of the identification-information area 42 to the time when the identification information I is next written thereinto.

Herein, the aforementioned predetermined timing is a timing at which, for example, the W/R process unit 21 completes the writing and reading based on the processing request of the task T. Moreover, not limited to this timing, it is sufficient that the timing is between the time from the time when the identification information I is written into the area 42A of the identification-information area 42 to the time when the identification information I is next written thereinto. The reading may be executed at a plurality of times in this period.

The W/R process unit 21 outputs, to a memory-abnormality determining unit 25*c*, the information read from the area 42A and the identification information I input together with the processing request. Thus, the memory-abnormality determining unit 25*c* performs determination to be mentioned later.

When the RAM 40 is determined to be normal as a result of the determination by the memory-abnormality determining unit 25*c*, the memory-abnormality determining unit 25*c* outputs a completion notification to the WDT unit 15. Thus, the WDT unit 15 stops the counting, and resets the count value.

The memory-abnormality determining unit 25*c* outputs the completion notification to the task T through the W/R process unit 21. Thus, for example, the next task T is started.

The determination unit 25 detects the memory-protection abnormality and the like in the RAM 40 while performing the memory protection of the RAM 40 on the basis of the information memorized in the identification-information area 42. The determination unit 25 includes the address determining unit 25*a*, the order determining unit 25*b*, and the memory-abnormality determining unit 25*c*.

The memory-abnormality determining unit 25*c* determines whether or not the RAM 40 is in abnormality on the basis of the information memorized in the identification-information area 42. Specifically, the memory-abnormality determining unit 25*c* acquires, from the W/R process unit 21, the identification information I of the processing request and the information read from the identification-information area 42.

Subsequently, the memory-abnormality determining unit 25*c* compares the aforementioned pieces of information with each other. When the aforementioned pieces of information coincide with each other as a result of the comparison, in other words, when both the pieces of information are the present identification information I, the memory-abnormality determining 25*c* determines that the identification-information area 42 is normal.

On the other hand, when the aforementioned pieces of information do not coincide with each other as a result of the comparison, in other words, when the present identification information I memorized in the identification-information area 42 is changed into other information, the memory-abnormality determining unit 25*c* determines that there exists the memory-protection abnormality.

This is because the identification information I written into the identification-information area 42 is rewritten by the time of the reading. Therefore, for example, even when another task T accesses, by the runaway of the program and the like, the RAM 40 not through the mediation unit 20 to execute the writing and reading, the memory abnormality can be detected.

Thus, the information processing device 1 can detect the memory-protection abnormality by using a simple configuration, and thus the dedicated hardware for performing the memory protection is not needed. Therefore, the memory protection can be performed inexpensively.

The address determining unit 25*a* determines whether or not the memory address specified by the task T accords to the memory use area 41 allocated by this task T. Specifically, first, the address determining unit 25*a* acquires, from the W/R process unit the specified memory address, the identification information I, and the range information.

Subsequently, the address determining unit 25*a* determines whether or not there exists the specified memory address in the memory area permitted by the identification information I on the basis of the range information. When the specified memory address accords, as a result of the determination, to the memory use area 41 allocated to this identification information I, namely the task T according to this identification information I, the address determining unit 25*a* outputs the permission notification to the W/R process unit 21.

In other words, when the memory address specified by the processing request of the task T is determined to be included in the memory area of the memory use area 41 allocated to the present task T, the mediation unit 20 accepts the processing request of the task T.

On the other hand, as a result of the determination, when the specified memory address is not included in the aforementioned memory area, the permission notification is not input to the W/R process unit 21. Therefore, in this case, the W/R process unit 21 does not start to write and read based on the processing request. Therefore, the completion notification is not input to the WDT unit 15, and thus the count value exceeds the threshold time, thereby leading to restarting the information processing device 1.

Thus, it is possible to prevent the task T from accessing the RAM 40 not through the mediation unit 20 caused by the runaway and the like. Therefore, the memory protection of the RAM 40 can be performed.

For example, when the processing request includes a plurality of writings and readings, the address determining unit 25a executes the determination on all of the specified memory addresses included in the processing request. The determining procedure may be simplified by, for example, executing the determination on only the first and last specified memory addresses included in the processing request.

The order determining unit 25b compares the identification information of the last task T, which is specified by task T, with the identification information I memorized in the identification-information area 42 to determine whether or not the execution order of the task T is correct.

Specifically, first, the order determining unit 25b acquires the task specifying information included in the processing request from the W/R process unit 21 and the identification information I read, by W/R process unit 21, from the identification-information area 42.

The timing at which the W/R process unit 21 reads the identification information I from the identification-information area 42 is before the update of the identification information I in the identification-information area 42. Therefore, the identification information I read by the W/R process unit 21 is the last identification information I.

Subsequently, the order determining unit 25b compares the identification information I of the task specifying information with the last identification information I. As a result of the comparison, when the task specifying information and the last identification information I coincide with each other, the order determining unit 25b determines that the execution order is correct, and outputs the permission notification to the W/R process unit 21. In other words the mediation unit 20 accepts the processing request of the task T when the execution order is determined to be correct by the order determining unit 25b.

As a result of the comparison, when the task specifying information and the last identification information I do not coincide with each other, the order determining unit 25b determines that the execution order of the task T is incorrect, a d does not output the permission notification to the W/R process unit 21. Therefore, the completion notification is not input to the WDT unit 15, and thus the count value exceeds the threshold time, thereby leading to restarting e information processing device 1.

Therefore, the execution order of the task T can be determined, and thus the runaway of the program and the like can be detected at other than a timing at which the memory abnormality is detected. Moreover, the information processing device 1 uses the identification information I of the task T for determining the memory abnormality, is written into the identification-information area 42, so that it is possible to easily determine whether or not the execution order of the task T is correct.

Figure 4:
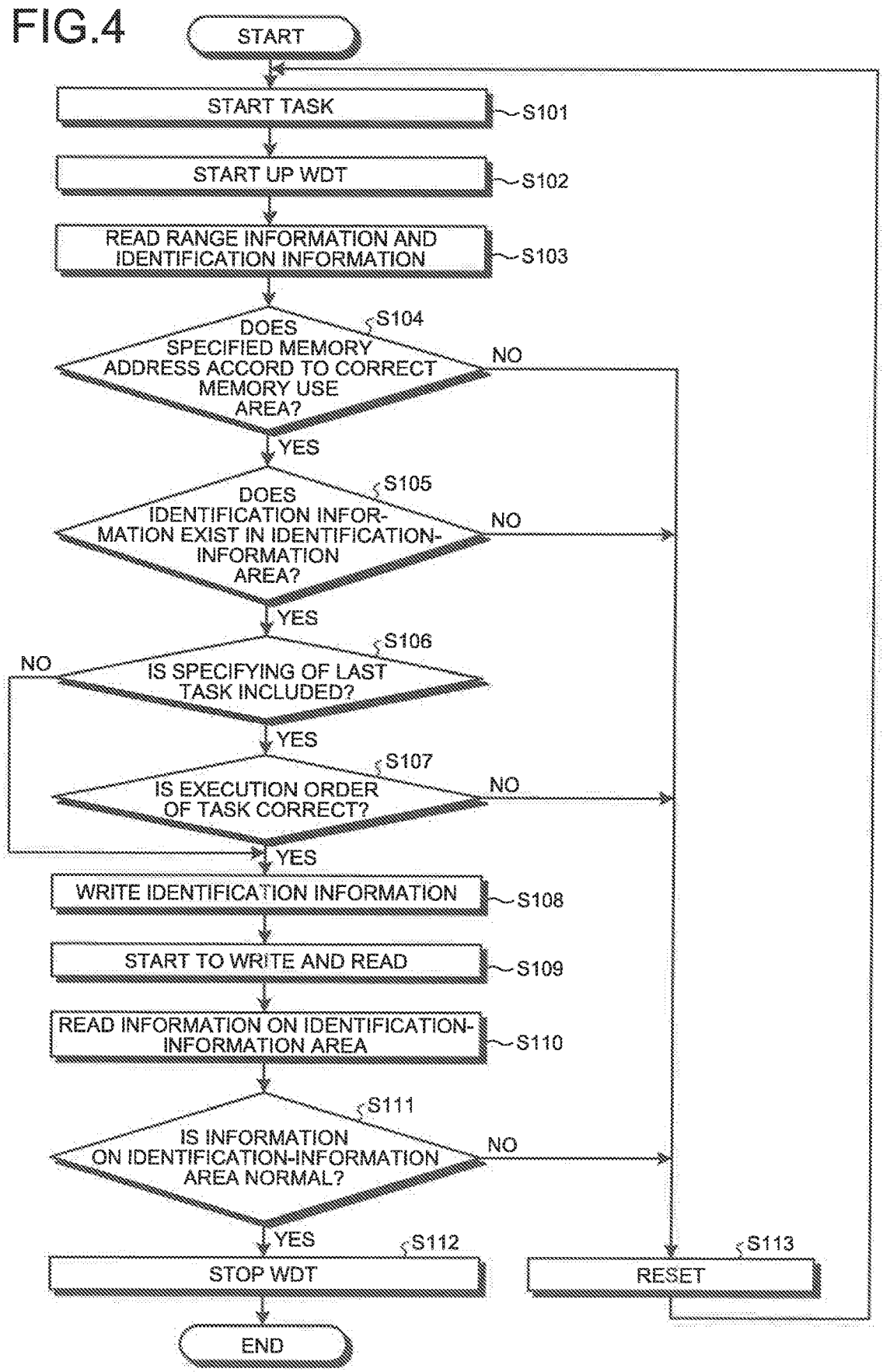
FIG. 4 is a flowchart illustrating a processing procedure executed by the information processing device according to the present embodiment.

Next, a processing procedure of the information processing device 1 according to the present embodiment will be explained with reference to FIG. 4. FIG. 4 is a flowchart illustrating the processing procedure executed by the information processing device 1 according to the present embodiment. The flowchart illustrated in FIG. 4 is repeatedly executed by the controller 10 illustrated in FIG. 2.

As illustrated in FIG. 4, first, the controller 10 starts the task T (Step S101). Subsequently, the WDT unit 15 sets the threshold time corresponding to the processing request, and starts up the WDT (Step S102).

Subsequently, the W/R process unit 21 reads the range information and the identification information I, which are memorized in the RAM 40 (Step S103). Subsequently, the address determining unit 25a determines whether or not the specified memory address accords to the correct memory use area 41 on the basis of the range information (Step S104).

When the address determining unit 25a determines that the specified memory address accords to the correct memory use area 41 in the determination in Step S104 (Step S104: Yes), the order determining unit 25b determines whether or not there exists the identification information I in the identification-information area 42 (Step S105).

On the other hand, when the specified memory address does not accord to the correct memory use area 41 in the determination of Step S104 (Step S104: No), the mediation unit 20 resets (restarts) the information processing device 1 (Step S113), and repeats the process of Steps after S101.

When the identification information I is determined to exist in the determination of Step S105 (Step S105: Yes), the order determining unit 25b determines whether or not the request from the task T includes the specifying of the last task T (Step S106). When the identification information is determined not to exist in the determination of Step S105 (Step S105: No), the controller 10 executes the process of Steps after S113.

When the last task T is specified in the determination of Step S106 (Step S106: Yes), the order determining unit 25b determines whether or not the execution order of the task T is correct (Step S107).

On the other hand, when the last task T is not specified in the determination of Step S106 (Step S106: No), the controller 10 executes the process of Steps after S108.

Subsequently, when the execution order of the task T is determined to be correct in the determination of Step S107 (Step S107: Yes), the W/R process unit 21 writes, for example, the identification information I into the identification-information area 42 (Step S108). On the other hand, when the execution order of the task T is determined to be incorrect in the determination of Step S107 (Step S107: No), the controller 10 executes the aforementioned process of Step S113.

Subsequently, the W/R process unit 21 starts to write and read on the basis of the processing request (Step S109). Subsequently, the W/R process unit 21 reads the information on the identification-information area 42 at a predetermined timing (Step S110).

Subsequently, the memory-abnormality determining unit 25c determines whether or not the information on the identification-information area 42 is normal (Step S111). When the information on the identification-information area 42 is determined to be normal (Step S111: Yes), the WDT unit 15 stops the WDT (Step S112), and terminates the process. When the information on the identification-information area 42 is determined to be abnormal (Step S111: No), the controller 10 executes the aforementioned process of Steps after S113.

Figure 5:
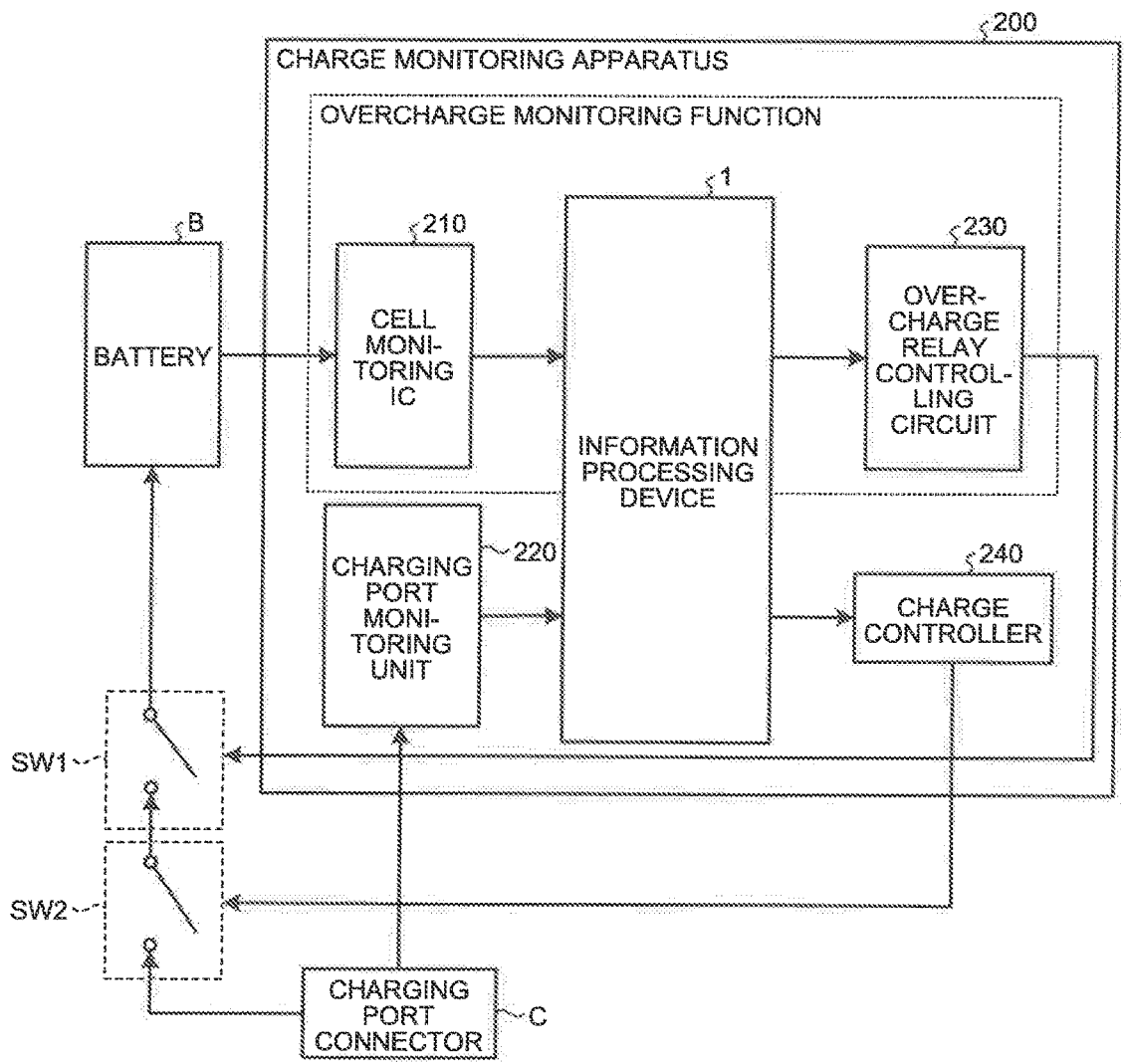
FIG. 5 is a diagram illustrating an application example of the information processing device according to the present embodiment.
Figure 6:
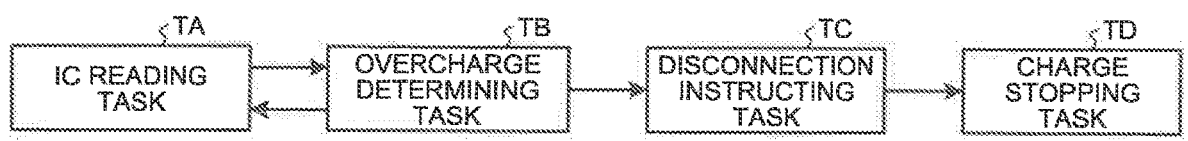
FIG. 6 is a diagram illustrating a specific example of tasks.

Next, an application example of the information processing device 1 according to the present embodiment will be explained with reference to FIGS. 5 and 6. FIG. 5 is a diagram illustrating an application example of the information processing device 1 according to the present embodiment. FIG. 6 is a diagram illustrating a specific example of the tasks T.

Hereinafter, the case where the information processing device 1 is applied to a charge monitoring apparatus of an electric vehicle and the like will be explained, however, not limited thereto, the information processing device 1 may be applied to an on-vehicle apparatus such as an Engine Control unit (ECU) of a vehicle.

As illustrated in FIG. 5, a charge monitoring apparatus 200 includes the information processing device 1, a cell monitoring integrated Circuit (IC) 210, a charging port monitoring unit 220, an overcharge relay controlling circuit 230, and a charge controller 240. The charge monitoring apparatus 200 is connected with a charging port connector C and a battery B.

A path connecting the charging port connector C and the battery B is provided with a switch SW1 and a switch SW2. When the battery B is not in the overcharged state, the switch SW1 on the battery B side is assumed to be turned on.

An overcharge monitoring function is needed to satisfy a predetermined safety standard. This is for preventing an accident such as firing caused by the overcharge of the battery B from occurring. The memory protection and the normal-order functioning of the tasks T are needed in the aforementioned safety standard.

When the information processing device 1 operates in the charge monitoring apparatus 200 while considering the tasks associated with the overcharge monitoring function as the aforementioned tasks T, it is possible to reliably detect the overcharged state, thereby leading to reliable disconnecting of the power supply to the battery B.

First, functions other than the overcharge monitoring function will be explained. The charging port monitoring unit 220 monitors the charging port connector C to detect the connection between a charging plug and the charging port connector C. When detecting the connection, the charging port monitoring unit 220 outputs, to the information processing device 1, a connection signal indicating the connection.

When the connection signal is input to the information processing device 1, the information processing device 1 determines whether or not, for example, the battery B is in a chargeable state on the basis of, for example, a connection state between the charging port connector C and the charging plug, running information, etc., and when determining that, for example, the battery B is in the chargeable state, the information processing device 1 outputs a charge starting instruction to the charge controller 240.

The charge controller 240 turns on the switch SW1 on the basis of the charge starting instruction input from the information processing device 1 so as to start to charge. Thus, the charge of the battery B is started.

The cell monitoring IC 210 is connected with the battery B, and monitors the voltage of the battery B. The voltage value monitored by the cell monitoring IC 210 is read by the information processing device 1 at an arbitrary timing. The cell monitoring IC 210 may monitor the current of the battery B.

Herein, the tasks T associated with the overcharge monitoring function will be explained with reference to FIG. 6. As illustrated in FIG. 6, the tasks T include, an IC reading task TA, an overcharge determining task TB, a disconnection instructing task TC, and a charge stopping task TD.

In the IC reading task TA, the voltage value monitored by the cell monitoring IC 210 is read at, for example, a predetermined cycle. The overcharge determining task TB compares the voltage value read by the IC reading task TA with an overcharge threshold value to determine whether or not, for example, the battery B is in the overcharged state.

As a result of the determination, when, for example, the battery B is not in the overcharged state, the IC reading task TA and the overcharge determining task TB are repeatedly executed. As a result of the determination by the overcharge determining task TB, when, for example, the battery B is in the overcharged state, the disconnection instructing task TC is executed. In the disconnection instructing task TO, a disconnection instruction is output to the overcharge relay controlling circuit 230.

When the disconnection instruction is input, the overcharge relay controlling circuit 230 disconnects the connection of the switch SW1. When the disconnection instructing task TO is executed, subsequently, the charge stopping task TD is executed. In the charge stopping bask TD, an instruction is output to the charge controller 240, which causes the charge controller 240 to stop the charge. Thus, the battery B can be prevented from being in the overcharged state.

Thus, when the information processing device 1 is applied to an on-vehicle apparatus, the information processing device 1 can perform the memory protection more inexpensively than the conventional. Thus the manufacturing cost of a vehicle can be more reduced while maintaining the safety compared with the conventional.

As described above, the information processing device 1 according to the present embodiment includes, the memory M and the mediation unit 20. The memory M includes the memory use areas 41 that are allocated to the respective tasks T, and the identification-information area 42 that identifies the tasks T. The mediation unit 20 mediates writing and reading, by one of the tasks T, into and from the memory use area 41. When accepting a request of the writing and reading from the one task T, the mediation unit 20 writes the identification information corresponding to the one task T into the identification-information area 42, further reads information memorized in the identification-information area 42 at a predetermined timing, and detects an abnormality in the memory on the basis of the read information. Thus, the memory protection can be performed inexpensively.

In the aforementioned embodiment, the case is exemplified where the memory use areas 41 and the identification-information area 42 are continuous areas, however, not limited thereto. In other words, the identification-information area 42 may be allocated between the memory use areas 41 that correspond to the tasks T. The identification-information area 42 may be plural. Thus, the memory abnormality can be detected more reliably.

In the aforementioned embodiment, the information memorized in the identification-information area 42 is read at a predetermined timing, and, when the read information differs from the written identification information I, the abnormality in the memory M is detected, however, is not limited thereto. In other words, the abnormality in the memory M may be detected when the read information includes a code other than a predetermined binary code.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
 a memory that includes:
  memory use areas that are allocated to respective tasks; and
  an identification-information area that memorizes a plurality of identification information for identifying the respective tasks; and
 a mediation unit that mediates writing and reading, requested by one of the tasks, into and from one of the memory use areas allocated to the one task, the mediation unit being configured to:
  when accepting a request for the writing and reading from the one task and one identification information corresponding to the one task, write, into the identification-information area, the one identification information corresponding to the one task,
  execute the writing and reading requested by the one task into and from the one memory use area,
  read, at a predetermined timing within a time interval from a first time when the one identification information corresponding to the one task is written into the identification-information area to a second time when identification information of an other task to be executed next to the one task is written into the identification-information area, information memorized in the identification-information area into which the one identification information of the one task has been written,
  compare the one identification information accepted from the one task with the information read out, from the identification-information area, at the predetermined timing, and
  detect an abnormality in the memory when the read information differs from the one identification information accepted from the one task.

2. The information processing device according to claim 1, further comprising:
 an address determining unit, wherein
 the identification-information area further memorizes address ranges of the respective memory use areas allocated to the tasks,
 the address determining unit determines whether or not a memory address specified by the request from the one task is included in an address range corresponding to the one task among the address ranges, and
 the mediation unit accepts the request when the address determining unit determines that the memory address is included in the address range corresponding to the one task.

3. The information processing device according to claim 1, further comprising:
 an order determining unit that compares identification information of a last task specified by the request from the one task with the one identification information memorized in the identification-information area to determine whether or not an execution order of the one task is correct, wherein
 the mediation unit accepts the request when the order determining unit determines that the execution order is correct.

4. The information processing device according to claim 1, further comprising:
 a watchdog timer in which a threshold time is set for each of requests of the tasks, wherein
 the mediation unit restarts the information processing device when a processing time for the memory exceeds the threshold time.

5. The information processing device according to claim 1, wherein the information processing device is placed in a vehicle.

6. An information processing method comprising:
 by using a memory that includes memory use areas allocated to respective tasks and an identification-information area memorizing a plurality of identification information for identifying the respective tasks,
 mediating writing and reading, requested by one of the tasks, into and from one of the memory use areas allocated to the one task, the mediating including:
  when accepting a request for the writing and reading from the one task and one identification information corresponding to the one task, writing into the identification-information area, the one identification information corresponding to the one task;
  executing the writing and reading requested by the one task into and from the once memory use area;
  reading, at a predetermined timing within a time interval from a first time when the one identification information corresponding to the one task is written into the identification-information area to a second time when identification information of an other task to be executed next to the one task is written into the identification-information area, information memorized in the identification-information area into which the one identification information of the one task has been written;
  comparing the one identification information accepted from the one task with the information read out, from the identification-information area, at the predetermined timing; and
  detecting an abnormality in the memory when the read information differs from the one identification information accepted from the one task.

7. An information processing device comprising:
 a memory that includes:
  memory use areas that are allocated to respective tasks; and
  an identification-information area that memorizes a plurality of identification information for identifying the respective tasks; and
 a processor configured to mediate writing and reading, requested by one of the tasks, into and from one of the memory use areas allocated to the one task, the processor being configured to:
  when accepting a request for the writing and reading from the one task and one identification information corresponding to the one task, write, into the identification-information area, the one identification information corresponding to the one task,
  execute the writing and reading requested by the one task into and from the one memory use area,
  read, at a predetermined timing within a time interval from a first time when the one identification information corresponding to the one task is written into the identification-information area to a second time when identification information of an other task to be executed next to the one task is written into the identification-information area, information memorized in the identification-information area into which the one identification information of the one task has been written, compare the one identification information accepted from the one task with the information read out, from the identification-information area, at the predetermined timing, and detect an abnormality in the memory when the read information differs from the one identification information accepted from the one task.

* * * * *